(12) United States Patent
Li

(10) Patent No.: US 7,101,073 B2
(45) Date of Patent: Sep. 5, 2006

(54) LIGHT POSITIONING DEVICE

(75) Inventor: Cheng-Wei Li, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 161 days.

(21) Appl. No.: 10/880,203

(22) Filed: Jun. 29, 2004

(65) Prior Publication Data

US 2005/0254260 A1   Nov. 17, 2005

(30) Foreign Application Priority Data

May 13, 2004   (TW) .............................. 93113441 A

(51) Int. Cl.
*F21V 7/04* (2006.01)
(52) U.S. Cl. ..................... 362/621; 362/628; 362/631
(58) Field of Classification Search ................ 362/607, 362/612, 613, 555, 561, 511, 330, 581, 628, 362/630, 633, 634, 608, 610; 349/58, 65
See application file for complete search history.

(56) References Cited

U.S. PATENT DOCUMENTS

| | | | | |
|---|---|---|---|---|
| 4,673,254 A | * | 6/1987 | Kato et al. ................... | 359/599 |
| 4,714,983 A | * | 12/1987 | Lang ............................ | 362/27 |
| 5,876,107 A | * | 3/1999 | Parker et al. ................ | 362/600 |
| 5,947,578 A | * | 9/1999 | Ayres .......................... | 362/629 |
| 6,241,358 B1 | * | 6/2001 | Higuchi et al. ............. | 362/613 |
| 6,530,670 B1 | * | 3/2003 | Hirayama .................... | 362/628 |
| 6,671,013 B1 | * | 12/2003 | Ohkawa ....................... | 349/62 |
| 6,942,374 B1 | * | 9/2005 | Lee ............................. | 362/615 |

FOREIGN PATENT DOCUMENTS

| | | |
|---|---|---|
| JP | 2002-221502 | 11/2000 |
| JP | 2003-036718 | 2/2003 |

* cited by examiner

*Primary Examiner*—Renee Luebke
*Assistant Examiner*—Gunyoung T. Lee
(74) *Attorney, Agent, or Firm*—Thomas, Kayden, Horstemeyer & Risley

(57) ABSTRACT

A light positioning device. The light positioning device comprises a light guide plate, a light source assembly and a frame. The light guide plate comprises a protrusion and a recess. The light source assembly is disposed on the protrusion of the light guide plate and abuts the light guide plate. The light source assembly comprises a light source module received in the recess of the light guide plate. The frame is disposed under the light guide plate and light source assembly.

8 Claims, 5 Drawing Sheets

LIGHT POSITIONING DEVICE

BACKGROUND

The present invention relates to a light positioning device, and in particular to a light positioning device capable of reducing errors in assembly of a light guide plate, a light source assembly and a frame thereof.

LCD devices are generally multiple-layer structures comprising a light guide plate, a light source assembly, an LCD panel, a reflective plate, a diffusing plate and a frame. Conventionally, the light source assembly is first fixed on the frame and the light guide plate is then fitted into the frame.

Referring to FIG. 1, one side 11 of a conventional frame 1 is formed with a plurality of protrusions 12 and a plurality of recesses 13. The protrusions 12 and recesses 13 are alternately formed on the side 11.

Referring to FIG. 2, a conventional light source assembly 2 comprises a flexible circuit board 21 and a plurality of light source modules 22. Each light source module 22 comprises at least one light-emitting diode (LED).

Referring to FIG. 3A, the light source assembly 2 is first disposed on the side 11 of the frame 1. At this point, the light source modules 22 of the light source assembly 2 are respectively received in the recesses 13 of the side 11. A light guide plate 3 is then fitted into the frame 1 and abuts the light source assembly 2 to form a light positioning device 10.

Specifically, a tolerance or error may occur during manufacture of the frame 1. Further, assembly errors may occur between the light guide plate 3 and the frame 1 and between the light source assembly 2 and the frame 1. The cross section of the assembled light positioning device 10 is shown in FIG. 3B. Accordingly, a gap A exists between a light-input surface 31 of the light guide plate 3 and a light-output surface 23 of the light source modules and a displacement B exists between the central line of a LED 24 (or the light source module 22) of the light source assembly 2 and the central line of the light guide plate 3. The gap A and displacement B are often large, such that light from the LED 24 (or the light source module 22) cannot be effectively utilized by the light guide plate 3. Thus, the performance of the light positioning device 10 is adversely affected.

Additionally, assembly of the light positioning device 10 is complicated, resulting in increased manufacturing time, manpower and cost.

SUMMARY

Accordingly, the invention provides an improved light positioning device to overcome the aforementioned problems. The light positioning device comprises a light guide plate, a light source assembly and a frame. The light guide plate comprises a protrusion and a recess. The light source assembly is disposed on the protrusion of the light guide plate and abuts the light guide plate. The light source assembly comprises a light source module received in the recess of the light guide plate. The frame is disposed under the light guide plate and light source assembly.

The light guide plate further comprises a main body. The protrusion and recess are formed on one side of the main body and the light source assembly abuts the main body.

The light source assembly further comprises a power transmission member electrically connected to the light source module.

The power transmission member comprises a flexible printed circuit board (FPCB) or a printed circuit board (PCB).

The light source module further comprises a light-emitting element.

The light-emitting element comprises a light-emitting diode (LED) or a cold cathode fluorescent lamp (CCFL).

The recess is rectangular, curved, or polygonal.

A detailed description is given in the following embodiments with reference to the accompanying drawings.

BRIEF DESCRIPTION OF THE DRAWINGS

An embodiment of the present invention can be more fully understood by reading the subsequent detailed description and examples with references made to the accompanying drawings, wherein.

DETAILED DESCRIPTION

Figure 1:
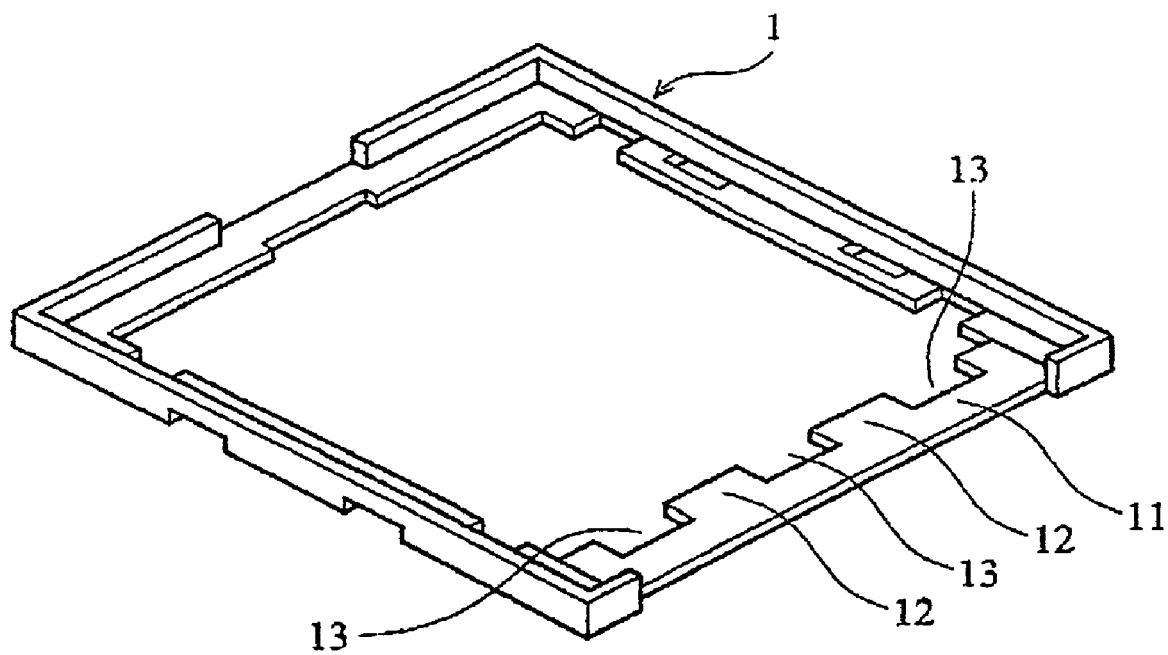
FIG. 1 is a schematic perspective view of a conventional frame.
Figure 2:
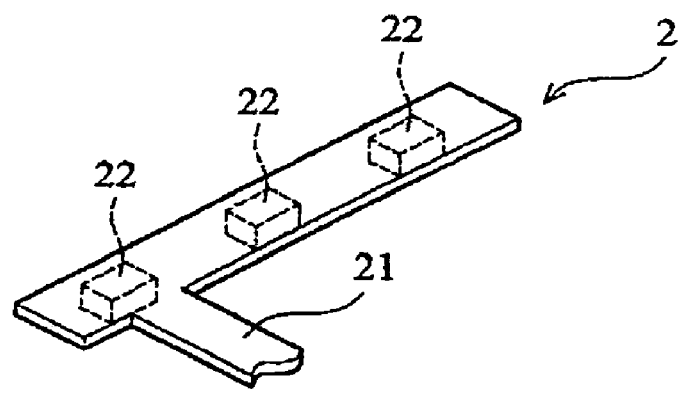
FIG. 2 is a schematic perspective view of a light source assembly.
Figure 3A:
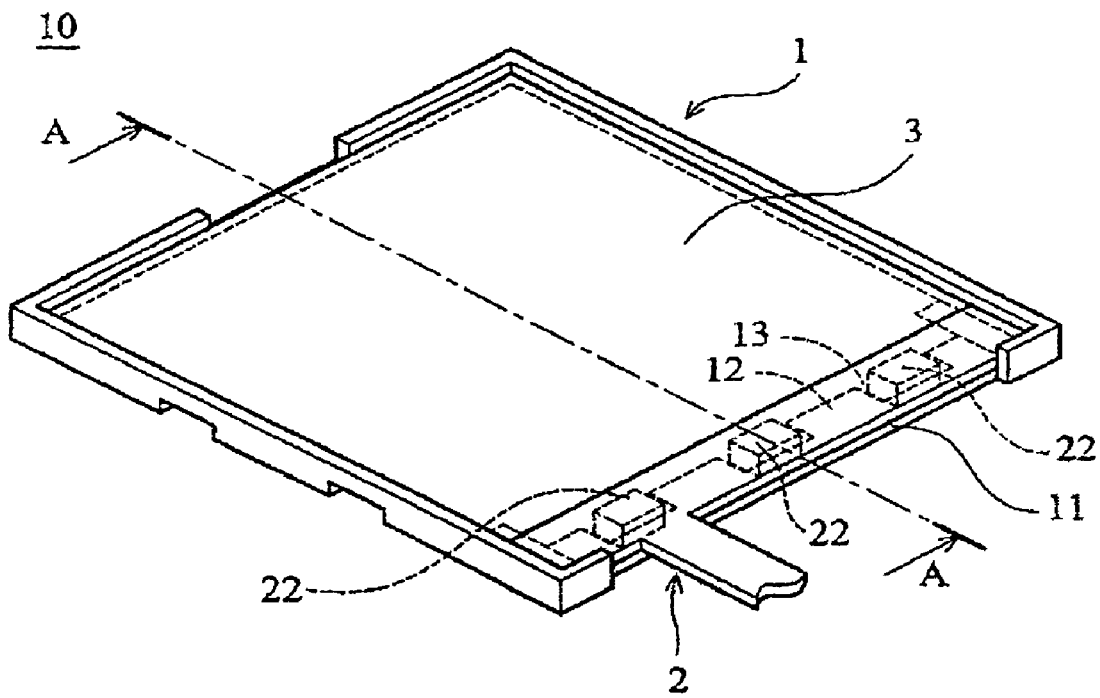
FIG. 3A is a schematic perspective view of a conventional light positioning device.
Figure 3B:
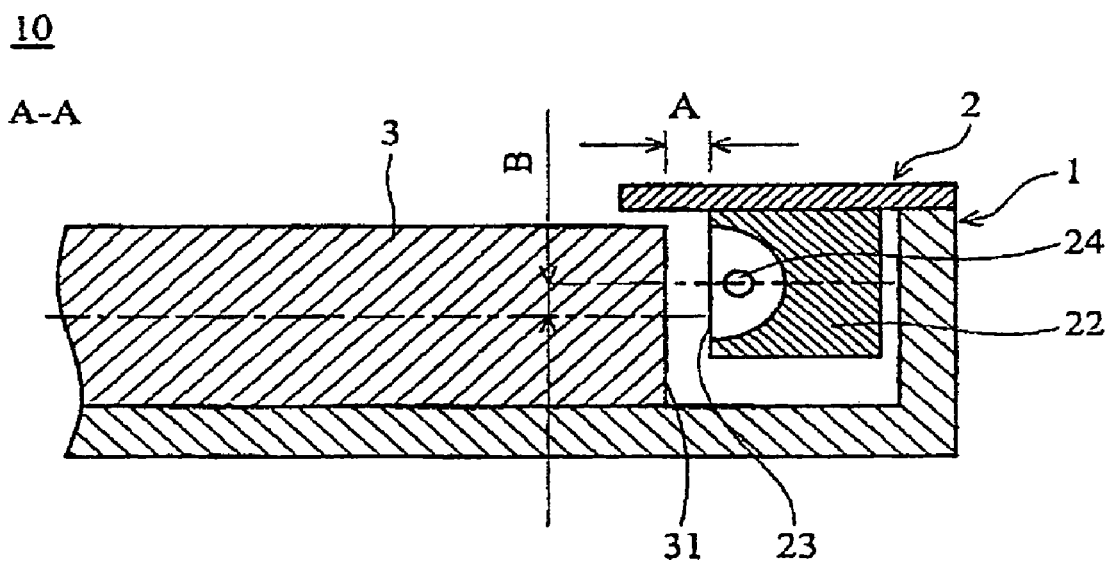
FIG. 3B is a partial cross section according to FIG. 3A.
Figure 4:
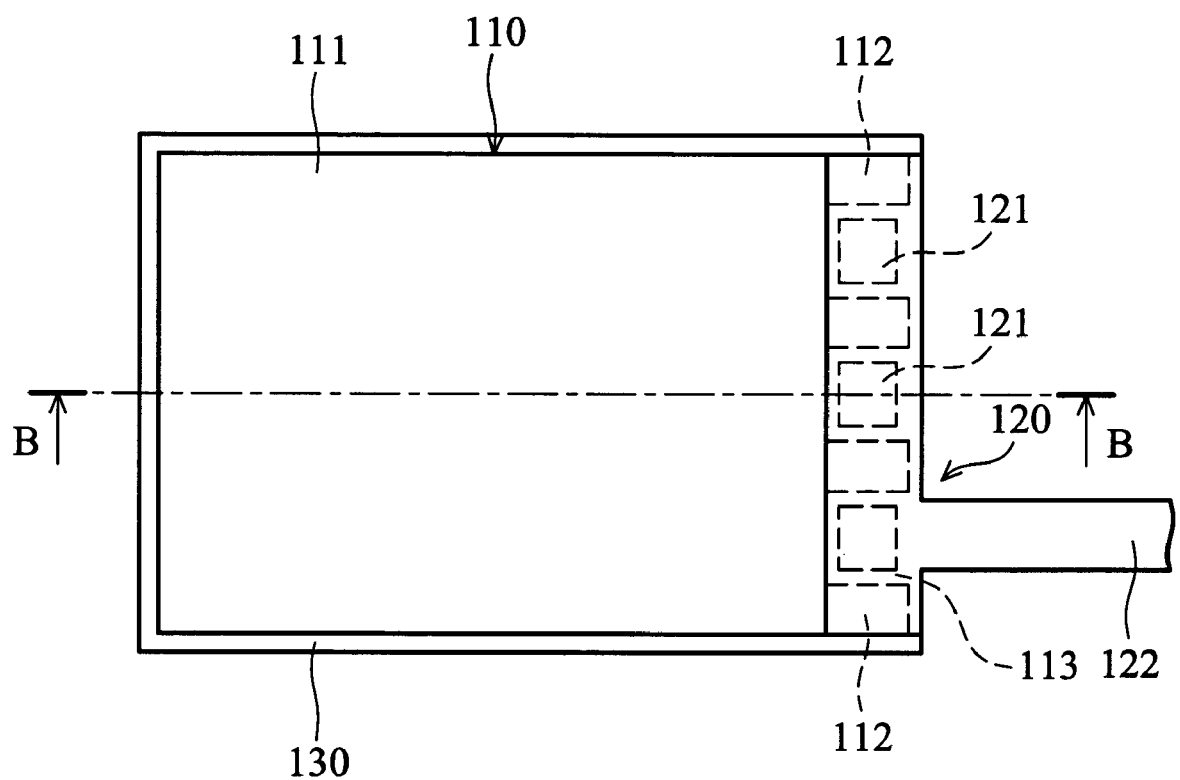
FIG. 4 is a schematic top view of the light positioning device of an embodiment of the invention.

Referring to FIG. 4, the light positioning device 100 comprises a light guide plate 110, a light source assembly 120 and a frame 130.

Figure 5A:
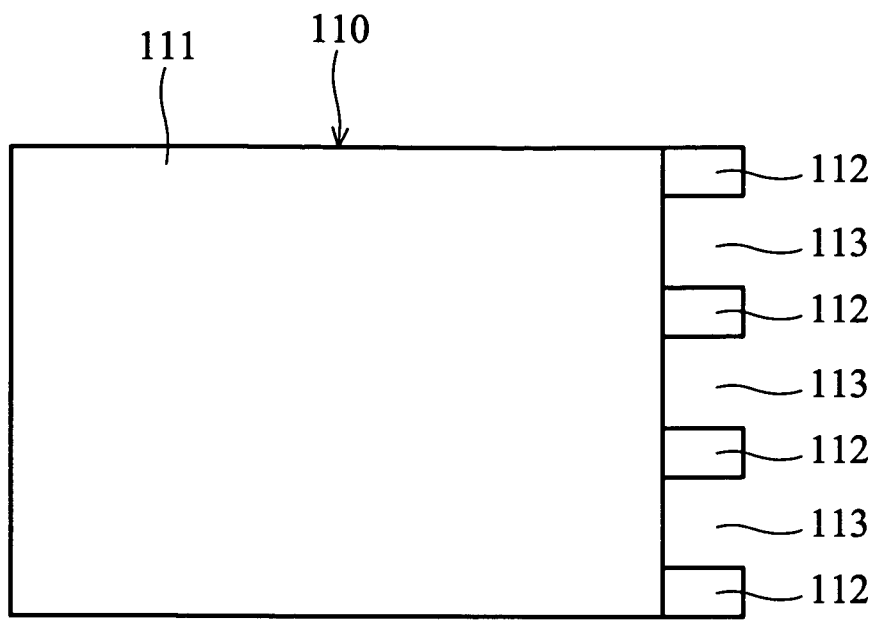
FIG. 5A is a schematic top view of the light guide plate of the light positioning device of an embodiment of the invention.
Figure 5B:
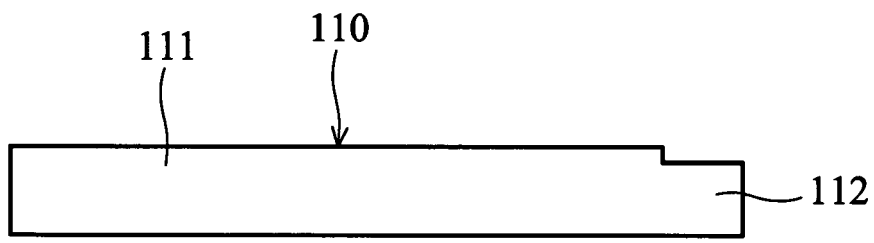
FIG. 5B is a schematic side view of the light guide plate of the light positioning device of an embodiment of the invention.
Figure 5C:
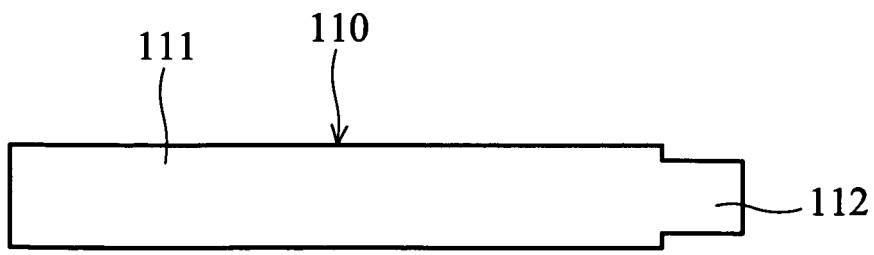
FIG. 5C is another schematic side view of the light guide plate of the light positioning device of an embodiment of the invention.

Referring to FIG. 4 and FIG. 5A, the light guide plate 110 comprises a main body 111, a plurality of protrusions 112 and a plurality of recesses 113. The protrusions 112 and recesses 113 are alternately formed on one side of the main body 111. The light guide plate 110 can alternatively comprise lateral shapes as shown in FIG. 5B and FIG. 5C.

Figure 6:
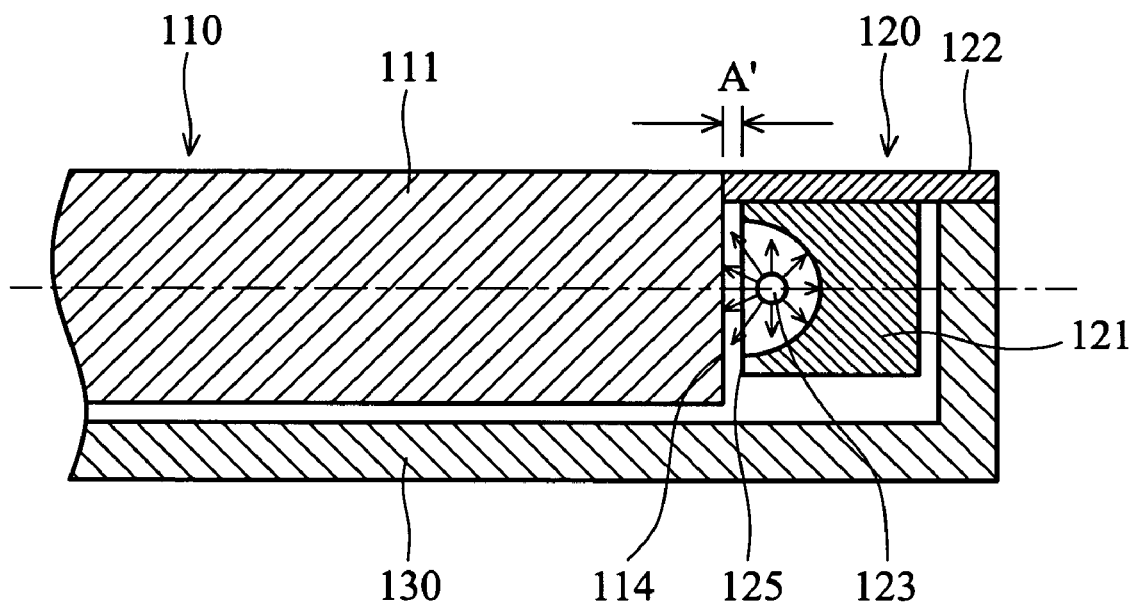
FIG. 6 is a partial cross section according to FIG. 4.

As shown in FIGS. 4, 5A and 6, the light source assembly 120 is disposed on the protrusions 112 of the light guide plate 110 and abuts the main body 111 thereof. The light source assembly 120 comprises a plurality of light source modules 121 received in the recesses 113 of the light guide plate 110. Moreover, the light source assembly 120 comprises a power transmission member 122. The light source modules 121 are disposed on the power transmission member 122 and electrically connected thereto. The light source modules 121 can thus acquire power via the power transmission member 122. Additionally, the power transmission member 122 can be a flexible printed circuit board (FPCB) or a printed circuit board (PCB).

As shown in FIG. 6, each light source module 121 further comprises a light-emitting element 123 disposed therein. The light-emitting element 123 can be a light-emitting diode (LED) or a cold cathode fluorescent lamp (CCFL).

Specifically, although the recesses 113 of the light guide plate 110 of this embodiment are rectangular, the recesses 113 can selectively be curved or polygonal in accordance with the shape of the light source modules 121.

The following description is directed to assembly of the light positioning device 100.

The light source assembly 120 is directly fixed on the protrusions 112 of the light guide plate 110. At this point, a gap A' between a light-input surface 114 of the main body 111 of the light guide plate 110 and a light-output surface 125 of each light source module 121 can be adjusted to be a minimal or optimal distance. The central lines of the light-emitting element 123 of each light source module 121 and main body 111 of the light guide plate 110 can also be adjusted to coincide with each other. As shown in FIG. 4, the assembled light source assembly 120 and light guide plate 110 are then fitted into the frame 130. At this point, the assembly of the light positioning device 100 is complete.

In conclusion, the light positioning device 100 has many advantages including the following. Since the light source assembly 120 is fixed directly on the light guide plate 110, the assembly errors therebetween are reduced. Each light-emitting element 123 directly outputs light toward the center of the main body 111 of the light guide plate 110. Thus, light from each light-emitting element 123 is effectively utilized by the light guide plate 110, enhancing brightness of the light positioning device 100 (or an LCD device). Moreover, the assembly of the light positioning device 100 is simplified, thereby reducing manufacturing time, manpower and cost. Additionally, the frame 130 is simplified. Namely, the frame 130 is formed without any protrusions and recesses as are required by the conventional frame 1, thus reducing manufacturing time and cost. Further, since the frame 130 is simplified, the frame 130 provides more space for additional deployment than the conventional frame 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light positioning device, comprising:
   a light guide plate, comprising a main body, a protrusion and a recess, wherein the protrusion and recess are formed on one side of the main body, and a thickness of the protrusion is less than that of the main body;
   a light source assembly disposed on the protrusion of the light guide plate and abutting the main body of the light guide plate, wherein the light source assembly comprise a light source module and a power transmission member, wherein the power transmission member comprises a printed circuit board (PCB), the light source module is received in the recess of the light guide plate, and the power transmission member is electrically connected to the light source and disposed on the protrusion; and
   a frame disposed under the light guide plate and light source assembly.

2. A light positioning device, comprising:
   a light guide plate comprising a main body, a protrusion and a recess, wherein the protusion and recess are formed on one side of the main body, and a thickness of the protrusion is less than that of the main body;
   a light source assembly disposed on the protrusion of the light guide plate and abutting the main body of the light guide plate, wherein the light source assembly comprises a light source module and a power transmission member wherein the power transmission member comprises a flexible printed circuit board (PCB), the light source module is received in the recess of the light guide plate, and the power transmission member is electrically connected to the light source module and disposed on the protrusion; and
   a frame disposed under the light guide plate and light source assembly.

3. The light positioning device as claimed in claim 2, wherein the light source module further comprises a light-emitting element.

4. The light positioning device as claimed in claim 3, wherein the light-emitting element comprises a light-emitting diode (LED).

5. The light positioning device as claimed in claim 3, wherein light-emitting element comprises a cold cathode flourescent lamp (CCFL).

6. The light positioning device as claimed in claim 2, wherein the recess is rectangular.

7. The light positioning device as claimed in claim 2, wherein the recess is curved.

8. The light positioning device as claimed in claim 2, wherein the recess is polygonal.

* * * * *